(12) United States Patent
Ben-Shahar

(10) Patent No.: US 10,354,275 B1
(45) Date of Patent: Jul. 16, 2019

(54) SYSTEM, METHOD, AND COMPUTER PROGRAM FOR CREATING A CUSTOMER SPECIFIC BUSINESS OFFER TEMPLATE

(71) Applicant: Amdocs Software Systems Limited, Dublin (IE)

(72) Inventor: Tal Ben-Shahar, Tel-Aviv (IL)

(73) Assignees: AMDOCS DEVELOPMENT LIMITED, Limassol (CY); AMDOCS SOFTWARE SYSTEMS LIMITED, Dublin (IE)

(*) Notice: Subject to any disclaimer, the term of this patent is extended or adjusted under 35 U.S.C. 154(b) by 1273 days.

(21) Appl. No.: 14/550,854

(22) Filed: Nov. 21, 2014

(51) Int. Cl.
*G06Q 30/00* (2012.01)
*G06Q 30/02* (2012.01)

(52) U.S. Cl.
CPC ....... *G06Q 30/0251* (2013.01); *G06Q 30/016* (2013.01)

(58) Field of Classification Search
None
See application file for complete search history.

(56) References Cited

U.S. PATENT DOCUMENTS

| | | | | |
|---|---|---|---|---|
| 2006/0069633 | A1* | 3/2006 | Breslow | G06Q 40/00 705/35 |
| 2008/0086369 | A1* | 4/2008 | Kiat | G06Q 30/02 705/14.41 |
| 2010/0211482 | A1* | 8/2010 | Nambiar | G06Q 10/087 705/30 |
| 2010/0251264 | A1* | 9/2010 | McGuire | G06Q 10/0637 719/317 |
| 2013/0226318 | A1* | 8/2013 | Procyk | G05B 13/021 700/33 |
| 2015/0287124 | A1* | 10/2015 | Ogrinz | G06Q 30/0635 705/26.81 |
| 2016/0045876 | A1* | 2/2016 | Kaucky | A61J 3/002 366/162.1 |
| 2017/0220029 | A1* | 8/2017 | Alun-Jones | G06Q 30/0601 |

* cited by examiner

*Primary Examiner* — Jamie R Kucab
(74) *Attorney, Agent, or Firm* — Zilka-Kotab, P.C.

(57) ABSTRACT

A system, method, and computer program product are provided for creating a customer specific business offer template. In use, a customer inquiry corresponding to at least one product or service associated with a business is received, the customer inquiry including information associated with requirements of the customer. Additionally, a currently available product or service associated with the business is selected based on the customer inquiry, the currently available product or service including a standard offering associated with the business. Further, the currently available product or service is modified to correlate with the information associated with the requirements of the customer in order to create a customer specific business offer. Moreover, the customer specific business offer is saved as a template to use for the customer.

6 Claims, 5 Drawing Sheets

SYSTEM, METHOD, AND COMPUTER PROGRAM FOR CREATING A CUSTOMER SPECIFIC BUSINESS OFFER TEMPLATE

FIELD OF THE INVENTION

The present invention relates to service providers, and more particularly to providing customers of such service providers with unique product/service offerings.

BACKGROUND

Business customers require their communication service provider (CSP) to provide tailored offerings and guaranteed agreed-upon pricing. To provide tailored offerings to each business customer, the communication service provider is typically required to build a unique offering in a product catalog for each business customer, which takes a large amount of effort and makes the unique offering non-profitable for most businesses (considering that most of the businesses are small-medium-businesses with less than 100 employees).

In addition, since the catalog is a central place for creating offerings for all the communication service provider's customers, updating the offerings in a catalog does not affect the active/existing products. This means that when a business customer wishes to change the offering for the existing products (e.g. active mobiles, etc.), the communication service provider will be required to update the catalog and to update all the existing products of that business customer.

One alternative is for the communication service providers to limit themselves to off-the-shelf offerings instead of customized offerings, which will not satisfy their customers.

There is thus a need for addressing these and/or other issues associated with the prior art.

SUMMARY

A system, method, and computer program product are provided for creating a customer specific business offer template. In use, a customer inquiry corresponding to at least one product or service associated with a business is received, the customer inquiry including information associated with requirements of the customer. Additionally, a currently available product or service associated with the business is selected based on the customer inquiry, the currently available product or service including a standard offering associated with the business. Further, the currently available product or service is modified to correlate with the information associated with the requirements of the customer in order to create a customer specific business offer. Moreover, the customer specific business offer is saved as a template to use for the customer.

DETAILED DESCRIPTION

Figure 1:
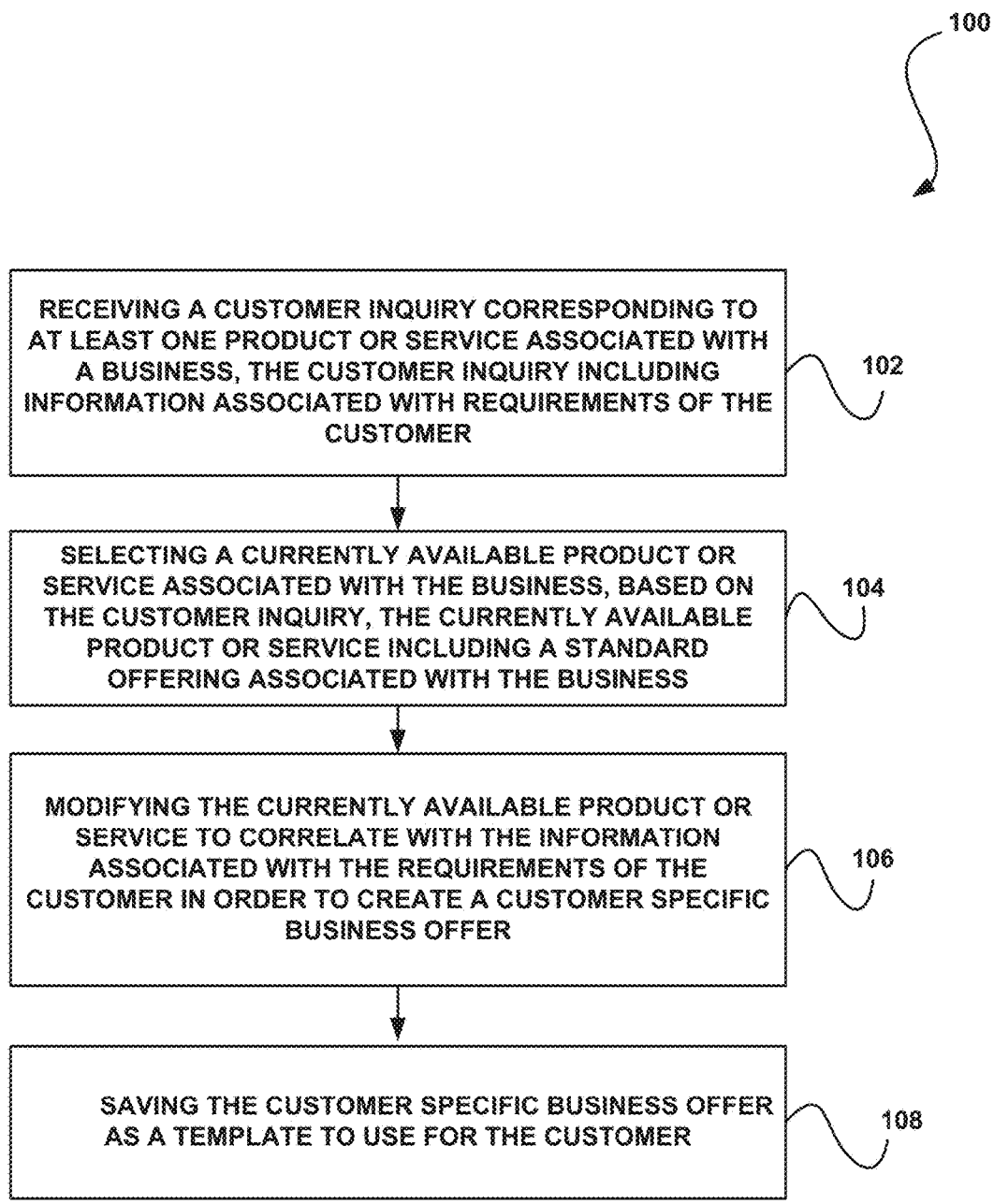
FIG. 1 illustrates a method for creating a customer specific business offer template, in accordance with one embodiment.

FIG. 1 illustrates a method 100 for creating a customer specific business offer template, in accordance with one embodiment.

As shown, a customer inquiry corresponding to at least one product or service associated with a business is received, the customer inquiry including information associated with requirements of the customer. See operation 102. In various embodiments, the customer inquiry may be received by a customer service representative (e.g. via a telephone, chat session, etc.), or by a self-service application (e.g. a web-based application, etc.).

The customer inquiry may be associated with a new product/service, or a product/service that the customer already has. Additionally, the information associated with the requirements of the customer may include any information, such as desired price information, desired data plan information, desired/required service information, and/or any customer needs/desires.

As shown further in FIG. 1, a currently available product or service associated with the business is selected based on the customer inquiry, the currently available product or service including a standard offering associated with the business. See operation 104. The currently available product or service may include any available product or service (e.g. from an existing catalogue, etc.).

In one embodiment, a customer service representative may select the currently available product or service based on the customer inquiry. In another embodiment, the customer may select the currently available product or service (e.g. using a self-service application, etc.). In another embodiment, the selection may be automatic based on the customer inquiry and/or information provided by the customer.

Further, the currently available product or service is modified to correlate with the information associated with the requirements of the customer in order to create a customer specific business offer. See operation 106. Moreover, the customer specific business offer is saved as a template to use for the customer. See operation 108.

In one embodiment, a customer service representative may modify the currently available product or service. In another embodiment, the customer may modify the currently available product or service (e.g. using a self-service application, etc.). In another embodiment, the modification may be automatic based on the customer inquiry and/or information provided by the customer.

Furthermore, in one embodiment, the method 100 may include selecting the customer specific business offer template in response to future contact by the customer. In this case, the customer specific business offer template may be utilized for providing future offers to the customer.

Utilizing this technique, a communication service provider may provide a tailored offering based on standardized off-the-shelf offerings with very small effort, allowing quick updates of the active products following the offering changes.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
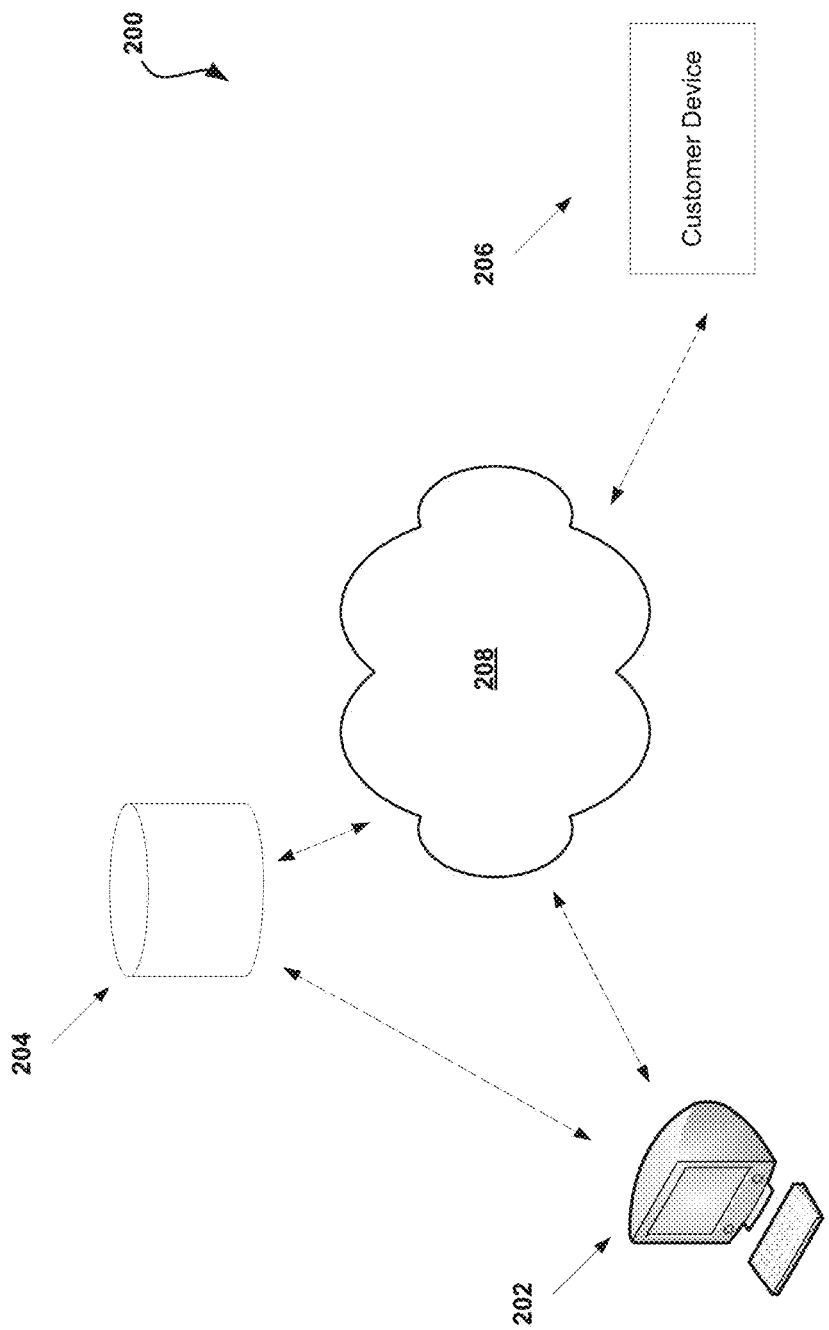
FIG. 2 illustrates a system for creating a customer specific business offer template, in accordance with one embodiment.

FIG. 2 illustrates a system 200 for creating a customer specific business offer template, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown, a business system 202 (e.g. operated by a customer service representative, etc.) has access to one of more business databases 204 that may include a plurality of product/service offerings and/or existing product catalogs. A customer of the business utilizing a customer device 206 (e.g. a computer, phone, etc.) may have access to a customer service representative and/or product/service offerings via one or more networks 208.

In operation, a communication service provider may utilize the system to build tailored offers for specific customers based on off-the-shelf offerings as a starting point. In one embodiment, this may be accomplished directly by the sales representative while negotiating with the business customer, with no offline implementation work required. The refined offer may be saved for the specific business customer (e.g. in the databases 204, etc.), including the exact services, plans, and pricing that are applicable only for this specific business customer.

When the business customer wishes to activate a new service, the starting point may be the tailored offering made for this business customer and not from the catalog. This will ensure that the business customer will get exactly what was agreed upon with the communication service provider.

When the business customer wishes to alter the offering (e.g. add a new service, etc.), the communication service provider just needs to alter the offering saved for the specific business customer and the system may update all the business customer relevant products accordingly. In one embodiment, the business customer may do this via a self-service application.

In one embodiment, this may be accomplished by allowing a customer service representative to select a product offering from an existing list in a catalog, refine it according to the customer wishes (and the price negotiation), and save it in the ordering database as a template (i.e. a business offer template) for the specific customer. When the customer service representative provides new services for this specific customer, the relevant business offer template may be selected and the system may inherit the saved configuration and pricing for the new provided product, and may save the relationship to the business offer template. Once the business offer template is updated, the system may search for all the products that were created from this business offer template and update it (e.g. by injecting a new order, etc.) according to the changes that were performed.

As an example, an off-the-shelf small-medium-business (SMB) offering for a mobile device may include a 3 MB data package by default. SMB 'A' may be extensively using data, and therefore may request a 5 MB data package for all employees. A customer service representative may use the off-the-shelf offering and update the default data package to 5 MB only for SMB 'A'. Accordingly, each mobile product that will be provided for SMB 'A' will include 5 MB data package.

After a while, SMB 'A' may see that this package is not enough and decide to upgrade the data package to unlimited data. The representative may return to the SMB 'A' specific offering template and change the data package from 5 MB to unlimited. All the existing (active) mobile services for this SMB may then be updated with the new package just after change was performed.

Figure 3:
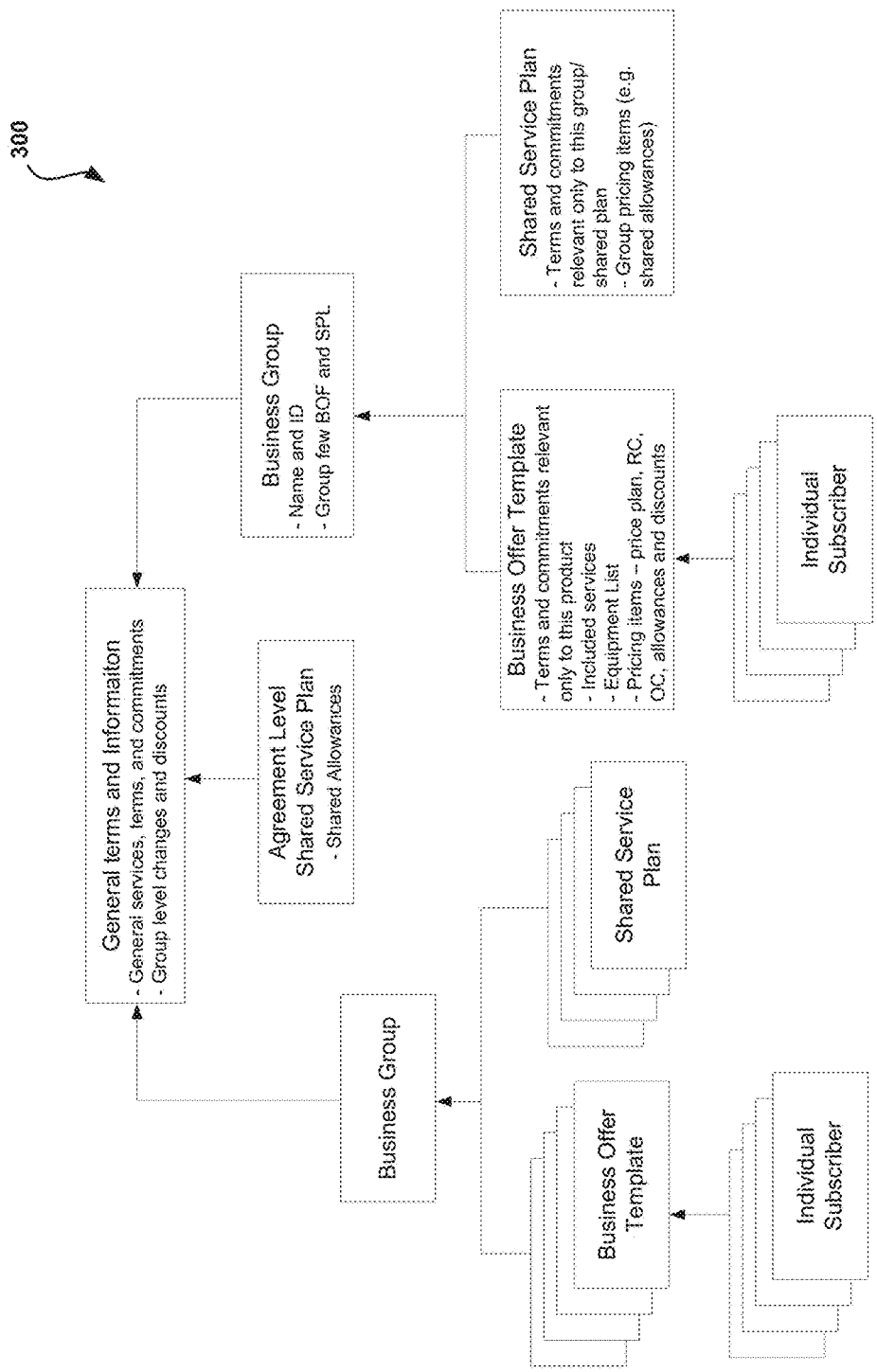
FIG. 3 illustrates framework agreement entities associated with creating a customer specific business offer template, in accordance with one embodiment.

FIG. 3 illustrates framework agreement entities 300 associated with creating a customer specific business offer template, in accordance with one embodiment. As an option, the entities 300 may be implemented in the context of the details of the previous Figures. Of course, however, entities 300 may be implemented in the context of any desired environment. Further, the aforementioned definitions may equally apply to the description below.

In general, an agreement refers to a type of a contract which provides a frame for current and future services that the CSP may provide to the SMB. Typically, such an agreement will include customer information, terms and commitments, services and equipment, and pricing, charges and fees. The entities presented in FIG. 3 will allow a CSP to structure and provision such an agreement.

With reference to FIG. 3, the "General Terms and Information" (GTI) represents an agreement between a CSP and a customer that regulates the services supplied by the CSP to the customer and the obligations of the customer to the CSP. The GTI is a Group Level Product (GLP) and represents an agreement between a CSP and a customer that regulates the services supplied by the CSP to the customer and the obligations of the customer to the CSP.

The GTI also holds an indication to specify that the GLP is acting as General Terms and Information. The GTI also holds attributes/parameters related to the plan commitment and terms such as min/max number of subscribers, minimum monthly spend, etc.

The GTI also includes group level charges (Billing Offers) excluding allowances. Agreement Level Allowances may be added as a separate product (Shared Service Plan) under the General terms and Information.

The entities also include an entity "Business Group" (BG) created in Ordering. The entity groups few Business Offers and Service Plans created for a specific type of end users (e.g. the SMB Sales team). This entity may include a simple entity that holds name, and ID and may be linked to the Framework Agreement. Moreover, this entity may not include a versioning mechanism.

The Business Offer and the Service Plan may be linked to this entity (e.g. by a unique ID) in runtime (e.g. not a catalog relation). Under one Business Group there may be at least one Business Offer.

The "Shared Service Plan" entity represents a plan in group level (mainly for shared allowances) and its commitments and terms. "Shared Service Plan" is created in EPC as Group Level Products (GLP) and holds an indication to specify that the GLP is acting as Service Plan. This entity also holds optional attributes/parameters related to the plan commitment and terms, assuming no relation between the Shared Service Plan commitment and the Business Offer commitment. This entity also includes group level charges (Billing Offers) including allowances.

The Business Offer Template may be created in run time using the selected Product Offering and may be saved based on the customer. The Business Offer serves as a template/prototype for the concrete products. The components and charges configured during negotiation will be inherited by the concrete products that are assigned to subscribers in the business group. Pricing of the Billing Offers may be saved (and may be inherited by the concrete later on).

The Business Offer product may be created from a regular product offering (e.g. the same as for consumer) or a dedicated Product Offering for an SMB. There are no special indications on the product or the Offer so any existing Product Offering the CSP may have can act as Business Offer. In one embodiment, if there is valid value selection, only one value may be selected. Further, in one embodiment, for equipment only, there may be multiple selection options, the value selected may be the valid values available for the concrete.

Figure 4:
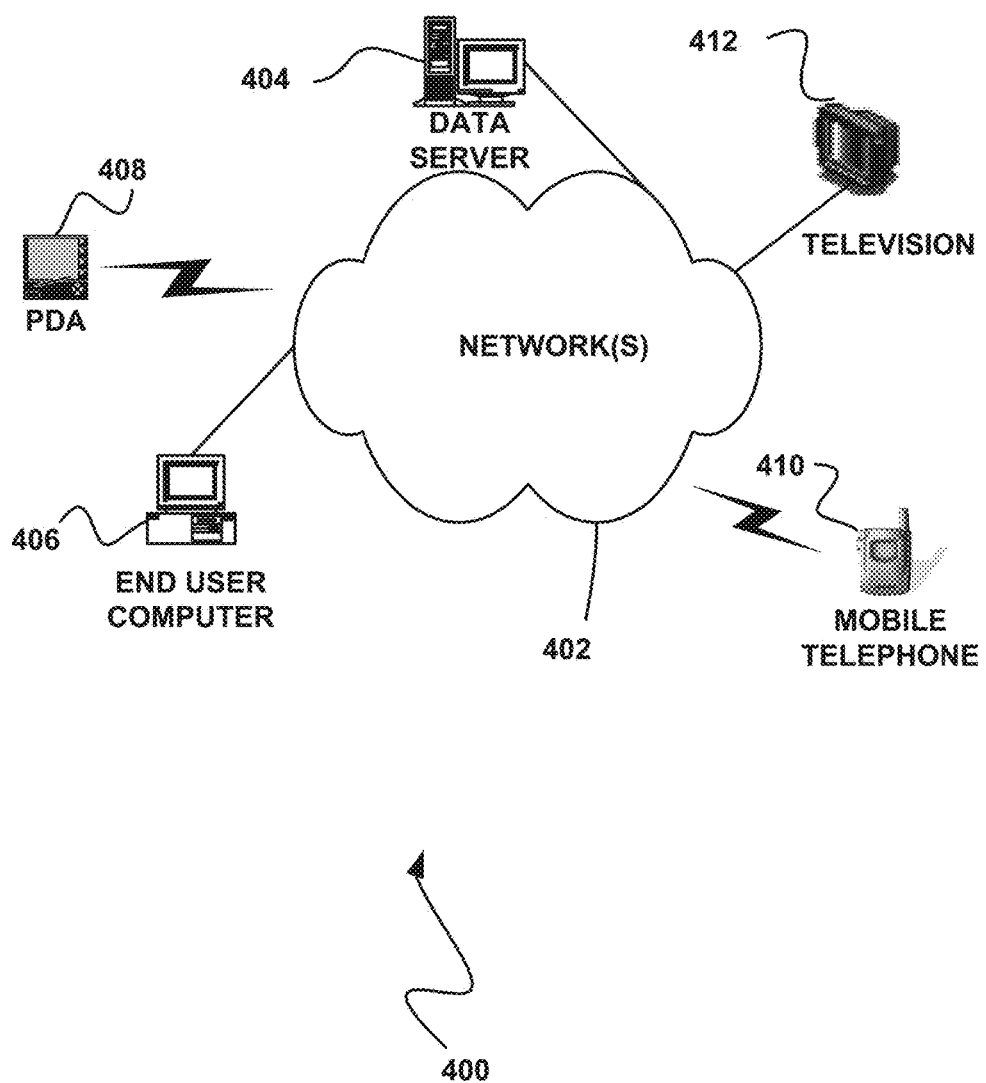
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
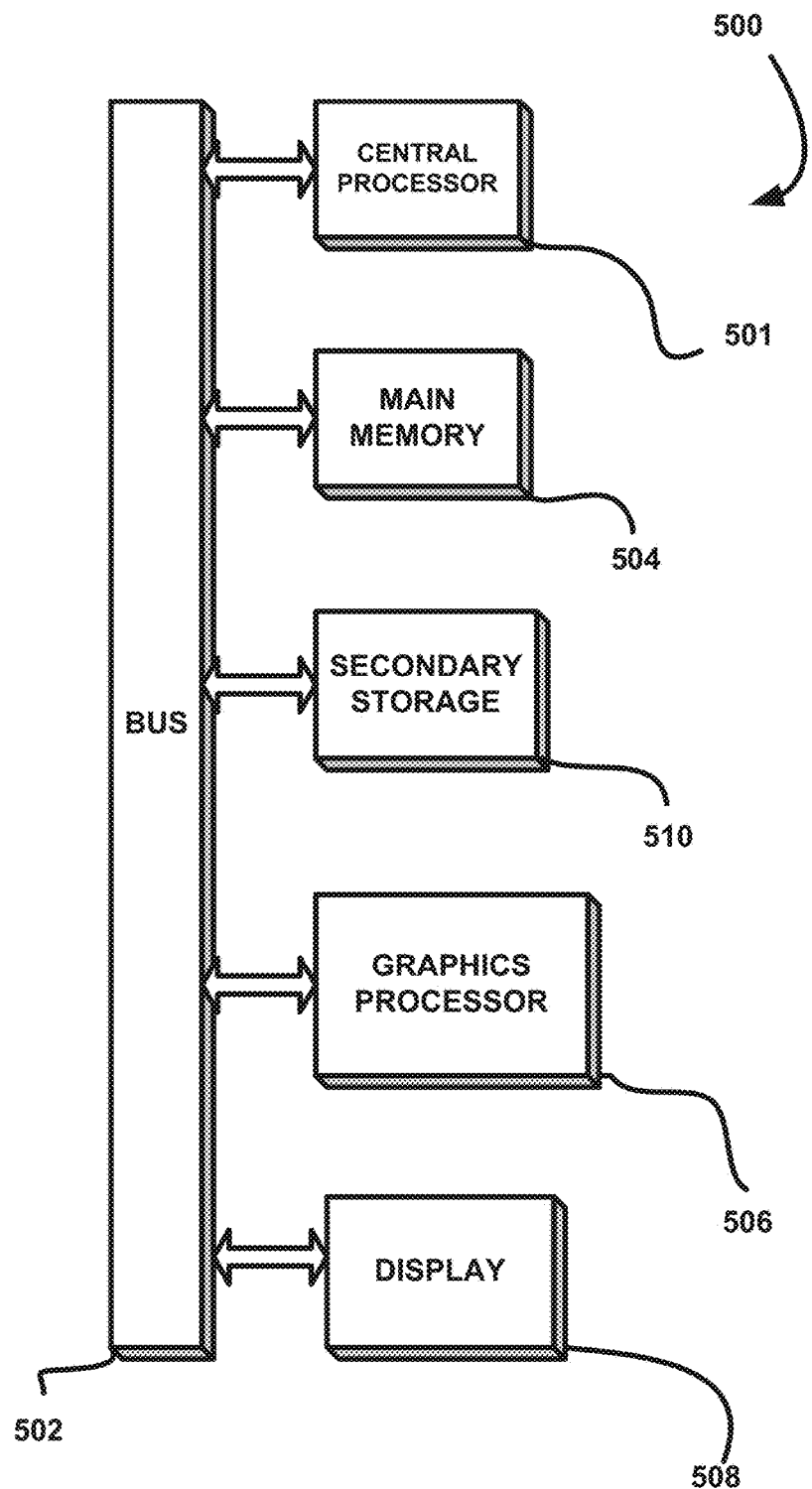
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a system, a customer inquiry corresponding to a product and a communications service associated with a business, the customer inquiry specifying requirements of the customer for the product and the communications service including:
   desired price information, and
   desired data plan information;
   selecting, by the system from an existing catalog in a database, a currently available product and service associated with the business, based on the customer inquiry, the currently available product and service including a standard offering associated with the business;
   creating, by the system, a customer specific business offer by modifying the currently available product and service to correlate with the requirements of the customer;
   saving, by the system in the database, the customer specific business offer as a template to use for the customer;
   providing, by the system, the customer specific business offer to the customer;
   receiving, by the system, a subsequent request from the user to activate a new service;
   responsive to the request, generating, by the system, an additional offer for the customer using the template saved in the database;
   providing, by the system, the additional offer to the customer;
   wherein responsive to the template being altered based on new customer requirements:
   searching, by the system, for all products created from the template, and
   updating all the products based on the altered template.

2. The method of claim 1, wherein the customer inquiry is received by a self-service application.

3. A non-transitory computer readable medium storing computer code executable by a computer processor of a system to perform a method comprising:
   receiving, by the system, a customer inquiry corresponding to a product and a communications service associated with a business, the customer inquiry specifying requirements of the customer for the product and the communications service including:
   desired price information, and
   desired data plan information;
   selecting, by the system from an existing catalog in a database, a currently available product and service associated with the business, based on the customer inquiry, the currently available product and service including a standard offering associated with the business;
   creating, by the system, a customer specific business offer by modifying the currently available product and service to correlate with the requirements of the customer;
   saving, by the system in the database, the customer specific business offer as a template to use for the customer;
   providing, by the system, the customer specific business offer to the customer;
   receiving, by the system, a subsequent request from the user to activate a new service;
   responsive to the request, generating, by the system, an additional offer for the customer using the template saved in the database;
   providing, by the system, the additional offer to the customer;
   wherein responsive to the template being altered based on new customer requirements:
   searching, by the system, for all products created from the template, and
   updating all the products based on the altered template.

4. The non-transitory computer readable medium of claim 3, wherein the customer inquiry is received by a self-service application.

5. A system comprising:
a memory system; and
one or more processing cores coupled to the memory system and that are each configured to:
receive a customer inquiry corresponding to a product and a communications service associated with a business, the customer inquiry specifying requirements of the customer for the product and the communications service including:
desired price information, and
desired data plan information;
select, from an existing catalog in a database, a currently available product and service associated with the business, based on the customer inquiry, the currently available product and service including a standard offering associated with the business;
create a customer specific business offer by modifying the currently available product and service to correlate with the requirements of the customer;
save, in the database, the customer specific business offer as a template to use for the customer;
provide the customer specific business offer to the customer;
receive a subsequent request from the user to activate a new service;
responsive to the request, generate an additional offer for the customer using the template saved in the database;
provide the additional offer to the customer;
wherein responsive to the template being altered based on new customer requirements, the system:
searches for all products created from the template, and
updates all the products based on the altered template.

6. The system of claim 5, wherein the system is operable such that the customer inquiry is received by a self-service application.

* * * * *